(12) United States Patent  
Patel et al.

(10) Patent No.: US 7,595,600 B2
(45) Date of Patent: Sep. 29, 2009

(54) METHOD AND SYSTEM FOR TORQUE CONTROL IN PERMANENT MAGNET MACHINES

(75) Inventors: Nitinkumar R. Patel, Cypress, CA (US); Brian A Welchko, Torrance, CA (US); Bonho Bae, Torrance, CA (US); Steven E. Schulz, Torrance, CA (US)

(73) Assignee: GM Global Technology Operations, Inc., Detroit, MI (US)

( * ) Notice: Subject to any disclaimer, the term of this patent is extended or adjusted under 35 U.S.C. 154(b) by 295 days.

(21) Appl. No.: 11/759,266

(22) Filed: Jun. 7, 2007

(65) Prior Publication Data

US 2008/0303475 A1 Dec. 11, 2008

(51) Int. Cl.
*H02P 7/00* (2006.01)

(52) U.S. Cl. .................. 318/432; 318/434; 318/400.32; 318/567

(58) Field of Classification Search .................. 318/432, 318/434, 400.32, 567
See application file for complete search history.

(56) References Cited

U.S. PATENT DOCUMENTS

| | | | | |
|---|---|---|---|---|
| 5,227,703 A | * | 7/1993 | Boothe et al. | 318/139 |
| 5,446,362 A | * | 8/1995 | Vanek et al. | 318/801 |
| 6,184,661 B1 | * | 2/2001 | Becker et al. | 322/25 |
| 6,366,043 B1 | * | 4/2002 | Stancu et al. | 318/432 |
| 6,598,008 B2 | * | 7/2003 | Lee | 702/147 |
| 6,900,607 B2 | * | 5/2005 | Kleinau et al. | 318/432 |
| 6,903,525 B2 | * | 6/2005 | Carson et al. | 318/432 |
| 7,026,776 B1 | * | 4/2006 | Walters | 318/434 |
| 7,071,649 B2 | * | 7/2006 | Shafer et al. | 318/783 |
| 7,199,549 B2 | * | 4/2007 | Kleinau et al. | 318/798 |
| 7,307,396 B2 | * | 12/2007 | Sychra et al. | 318/471 |
| 7,319,300 B2 | * | 1/2008 | Hahn | 318/400.32 |
| 7,323,833 B2 | * | 1/2008 | Mir | 318/100 |
| 7,353,094 B2 | * | 4/2008 | Okoshi et al. | 701/22 |
| 7,395,209 B1 | * | 7/2008 | Mesarovic et al. | 704/500 |
| 2003/0009309 A1 | * | 1/2003 | Lee | 702/147 |
| 2003/0071594 A1 | * | 4/2003 | Kleinau et al. | 318/567 |
| 2003/0076061 A1 | * | 4/2003 | Kleinau et al. | 318/432 |
| 2003/0076064 A1 | * | 4/2003 | Kleinau et al. | 318/567 |
| 2003/0076065 A1 | * | 4/2003 | Shafer et al. | 318/567 |
| 2004/0249518 A1 | * | 12/2004 | Okoshi et al. | 701/1 |
| 2006/0066275 A1 | * | 3/2006 | Thunes et al. | 318/432 |
| 2006/0126250 A1 | * | 6/2006 | Sychra et al. | 361/103 |
| 2006/0267531 A1 | * | 11/2006 | Hahn | 318/439 |
| 2007/0108937 A1 | * | 5/2007 | Mir | 318/807 |
| 2008/0297097 A1 | * | 12/2008 | Lee et al. | 318/701 |

* cited by examiner

*Primary Examiner*—Paul Ip

(57) ABSTRACT

Methods and systems are provided for controlling permanent magnet machines. The method includes determining a maximum torque of the PM machine based on an error between a commanded d-axis flux and an estimated d-axis flux of the PM machine, and adjusting a torque command based on the maximum torque. The error associated with a variation between a current temperature and a nominal temperature of the PM machine.

20 Claims, 4 Drawing Sheets

METHOD AND SYSTEM FOR TORQUE CONTROL IN PERMANENT MAGNET MACHINES

TECHNICAL FIELD

The present invention generally relates to controlling alternating current (AC) motors, and more particularly relates to systems and methods for torque control in permanent magnet machines.

BACKGROUND OF THE INVENTION

Conventional motor control for electric drive systems utilizes two-dimensional look-up tables to generate maximum torque limits (e.g., for both motoring and regenerating operations). Generally, maximum torque limits are required to accomplish various performance requirements of a drive system. For example, maximum torque limits are typically required for maintaining the vehicle battery within a predetermined range of operating voltage and power. One method of maintaining the battery within the predetermined operating range is to limit torque in the traction system. For example, during motoring, a motoring torque may be limited to keep the battery voltage above the minimum operating voltage. In another example, during regeneration, a regenerating torque may be limited to keep the battery voltage below a maximum value. In other cases, the torque limits may reflect the maximum torque capability of the motor to operate within specified voltage and current limits of the drive system under existing operating conditions.

Reference to torque limit look-up tables may be used when generating torque commands. Typically, the maximum torque limits generated from the look-up tables are calculated at a steady state stator temperature. However, during vehicle operation, the temperature of the drive system may vary. As a result, the maximum motoring and regenerating torque that the drive system can produce may differ (e.g., as a function of temperature) from the maximum torque limits generated from the look-up tables.

Accordingly, it is desirable to provide methods and systems for adjusting torque commands of permanent magnet machines that compensate for magnet temperature variation. Additionally, it is desirable to provide methods and systems for determining torque limits of permanent magnet machines that compensate for magnet temperature variations. Furthermore, other desirable features and characteristics of the present invention will become apparent from the subsequent detailed description and the appended claims, taken in conjunction with the accompanying drawings and the foregoing technical field and background.

SUMMARY OF THE INVENTION

Methods and system are provided for controlling a synchronous machine including, but not necessarily limited to, a permanent magnet (PM) machine. The PM machine is responsive to a commanded d-axis flux and a torque command. In one embodiment, a method for controlling a PM machine includes determining a maximum torque of the PM machine based on an error between the commanded d-axis flux and an estimated d-axis flux of the PM machine, and adjusting the torque command based on the maximum torque to compensate. The error associated with a variation between a current temperature of the PM machine and a nominal temperature of the PM machine.

In another embodiment, a system for controlling a PM machine includes a first processing module configured to estimate a maximum torque of the PM machine for a current operating temperature based on an error between the commanded d-axis flux and an estimated d-axis flux of the PM machine, and a second processing module coupled to the first processing module. The error represents a temperature variation from a nominal operating temperature of the PM machine. The second processing module is configured to adjust the torque command based on the maximum torque to compensate for the temperature variation.

In another embodiment, a drive system includes a PM machine having a first torque limit at a nominal temperature and having a magnet temperature, an inverter coupled to the PM machine, and a controller coupled to the inverter. The inverter is configured to drive the PM machine with an alternating current (AC) voltage, and the PM machine produces a current based on the AC voltage. The controller is configured to determine a second torque limit of the PM machine based on the magnet temperature and further configured to adjust the current based on the second torque limit to compensate for a variation between the magnet temperature and the nominal temperature.

DESCRIPTION OF THE DRAWINGS

The present invention will hereinafter be described in conjunction with the following drawing figures, wherein like numerals denote like elements.

DESCRIPTION OF AN EXEMPLARY EMBODIMENT

The following detailed description is merely illustrative in nature and is not intended to limit the invention or the application and uses of the invention. Furthermore, there is no intention to be bound by any expressed or implied theory presented in the preceding technical field, background, brief summary or the following detailed description.

Systems and methods are provided for controlling a permanent magnet (PM) machine that modifies the maximum torque limits of the PM machine to compensate for the effect of a temperature variation (e.g., an offset from a nominal temperature) on the torque output of the PM machine. In one embodiment, the maximum torque limits are modified based on a portion of the torque that is attributable to the permanent magnet. For example, the maximum torque limits are modified based on a d-axis flux error of the PM machine resulting from the temperature variation. The d-axis flux error represents a variation between a current temperature of the PM machine and a nominal temperature of the PM machine. This error may also represent a variance in magnetic strength due to a degradation of the magnetic characteristics over the life of the permanent magnet.

Figure 1:
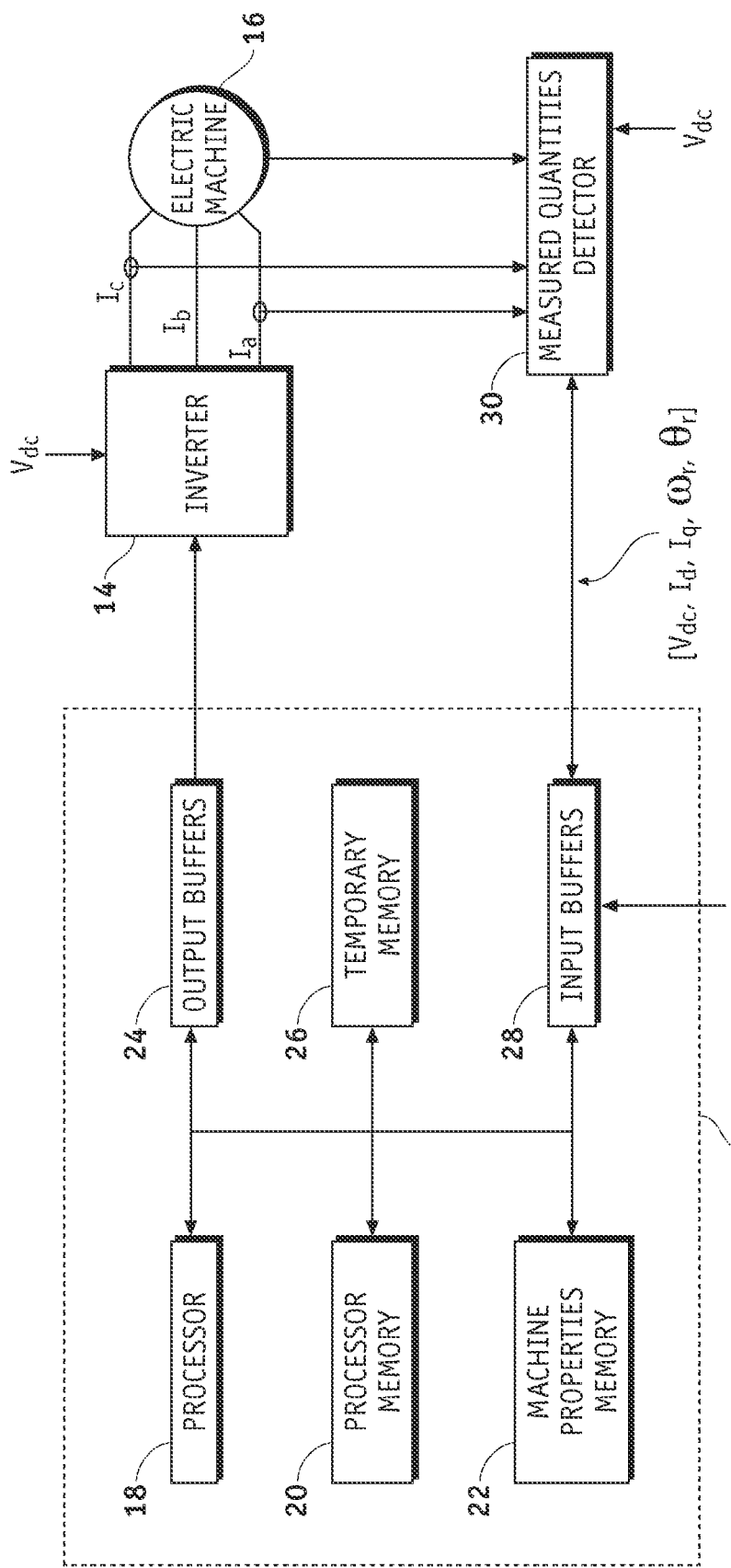
FIG. 1 is a block diagram of a drive system including a PM machine in accordance with one embodiment of the present invention.

Referring to FIG. 1, a drive system 10 including a PM machine (electric machine) 16 is shown in accordance with one embodiment of the present invention. The drive system 10 comprises a controller 12, an inverter 14 (e.g., a voltage source inverter) coupled to the controller 12, the PM machine 16 coupled to the inverter 14, and a detector 30. The detector 30 has a first input for receiving measured phase currents (e.g., $I_a$, $I_b$, and $I_c$), a second input coupled to the PM machine 16, and an output coupled to the controller 12 that supplies measured quantities of a variety of system outputs to the controller 12. The detector 30 acquires the measured quantities including, but not necessarily limited to, a supply potential (e.g., a battery potential or DC bus voltage ($V_{dc}$)), the measured phase currents (e.g., $I_a$, $I_b$, and $I_c$, although measurement of two phase currents may be enough for a Y connected machine with a floating neutral), a motor speed ($\omega_r$), a rotor phase angle ($\theta_r$), or the like. From the measured quantities, the controller 12 produces duty cycle commands and supplies the duty cycle commands to the inverter 14. The inverter 14 produces three-phase voltages (e.g., $V_a$, $V_b$, $V_c$) from the supply potential ($V_{dc}$) using the duty cycle commands and drives the PM machine 16 with the three-phase voltages.

In one embodiment, the inverter 14 converts the supply potential ($V_{dc}$) into an AC voltage, based on the duty-cycle commands, which is used to drive the PM machine 16. The inverter 14 can also vary the amount of AC voltage applied to the PM machine 16 (e.g., the inverter 14 can vary the voltage using pulse width modulation (PWM)), thus allowing the controller 12 to control the PM machine current. For example, the amount of voltage that the inverter 14 applies to the PM machine 16 may be indicated by a modulation index, and the PWM may be established between pre-determined modulation index limits.

The controller 12 comprises a processor 18, a processor memory 20, a machine properties memory 22, an input buffer 28, an output buffer 24, and a temporary memory 26 coupled to one another. The measured quantities are received by the input buffer 28 and may be stored in the machine properties memory, processor memory, or temporary memory 26 during operation of the controller 12. The controller 12 executes one or more programs (e.g., to optimize current commands for a predetermined control parameter, to account for over-modulation region operation of the permanent magnet machine, or the like) to determine any precursor elements (e.g., modified current commands, voltage commands, torque commands, or the like) used in determining the duty cycle commands.

In an exemplary embodiment, the controller 12 is partitioned into one or more processing modules that are associated with one or more of the controller operations. For example, the maximum torque production capability of the PM machine 16 is useful for establishing performance criteria of various components of the drive system 10 and for operating the drive system 10 to meet such performance criteria. The operating temperature of the drive system 10 may vary, and this temperature variation can affect the strength of the permanent magnet (i.e., associated with the PM machine 16). Thus, the controller 12 determines maximum torque limits (e.g., for motoring as well as regenerating operations) or modifies pre-determined maximum torque limits (e.g., determined for a nominal temperature and stored in one or more look-up tables in the processor memory 20, machine properties memory 22, or the like) such that the resulting maximum torque limits reflect the torque production capability of the PM machine 16 over a variety of operating temperatures. For example, the resulting maximum torque limits are modified such that the permanent magnet portion of the torque production capability accounts for temperature variations.

The controller 12 may include additional modules, such as a current command source, a current regulator, a field-weakening voltage control module, or the like. The current command source produces d-axis and q-axis current commands (e.g., using a current command look-up table that may be stored in the processor memory 20) that may be optimized for a predetermined control parameter (e.g., system efficiency). The current command table is preferably optimized for one or more pre-determined control parameters (e.g., system efficiency). The current command table may be derived from any number of models for optimizing desired control parameter(s). The current command table may also be pre-determined based on voltage and current limits of the PM machine 16 so that the current command source applies an appropriate amount of d-axis and q-axis currents to the PM machine to produce a desired torque (e.g., with high efficiency) and maintain current regulation stability (e.g., by controlling the machine terminal voltage). For a particular torque command (T*), rotor speed ($\omega_r$), and supply potential ($V_{dc}$), such as collected by the detector 30 and supplied to the controller 12, an optimized d-axis current command ($I^*_d$) and q-axis current command ($I^*_q$) may be determined from the current command table.

The field-weakening voltage control module produces a feedback current for modifying the current command(s), and the current regulator converts the current commands and supplies duty cycles to the inverter 14, which in turn applies the appropriate voltage (e.g., three-phase voltages) to the PM machine 16 to produce the commanded current for the PM machine. One or more of the various processing modules of the controller 12, as well as one or more of the operations of the controller 12, may be embodied as separate components of the drive system 10 or incorporated with another component of the drive system 10 (e.g., the current regulator incorporated with the inverter 14). Although the controller 12 is configured to determine maximum torque limits that account for temperature variation, the controller 12 may also regulate the torque output of the PM machine to satisfy a variety of other performance criteria.

The PM machine 16 can operate in a powering or motoring mode and in a regenerating mode, although the PM machine 16 may operate in other modes. Motor torque (i.e., the torque produced by the PM machine 16) generally comprises two components: a reluctance torque and a magnetic torque. The motor torque ($T_e$) may be represented by $$T_e = \frac{3P}{4}(\lambda_d i_q - \lambda_q i_d), \qquad \text{(eq. 1)}$$

where P is the number of poles of the PM machine 16, $i_q$ is the q-axis current of the PM machine 16, $i_d$ is the d-axis current of the PM machine 16, $\lambda_d$ is the d-axis flux of the PM machine 16, and $\lambda_q$ is the q-axis flux of the PM machine 16. The d-axis flux and q-axis flux may be respectively represented by $$\lambda_d = L_d i_d + \phi_{mag} \qquad \text{(eq. 2)}$$

$$\lambda_q = L_q i_q \qquad \text{(eq. 3),}$$

where $\phi_{mag}$ is the magnetic flux of the PM machine 16. Substituting eqs. 2 and 3 into eq. 1, $$T_e = \frac{3p}{4}(\varphi_{mag} i_q + (L_d - L_q) i_d i_q). \quad \text{(eq. 4)}$$

A first term of the torque equation (eq. 4) is related to the magnetic torque of the PM machine 16, and a second term is related to the reluctance torque of the PM machine 16. In general, as the operating temperature of the PM machine 16 increases, the strength of the permanent magnet decreases resulting in a reduction of the generated magnetic torque. This effect can be modeled with an error ($\lambda_{d\_Error}$) between a commanded d-axis flux ($\lambda^*_d$) and an estimated d-axis flux ($\hat{\lambda}_d$) such that $$\lambda_{d\_Error} = \lambda^*_d - \hat{\lambda}_d \approx L_{d0} i^*_d + \phi_{mag0} - L_d i_d - \phi_{mag} \quad \text{(eq. 5)},$$

where $L_{d0}$ is a pre-determined nominal inductance as a function of the d-axis current, $i^*_d$ is the d-axis current command, $L_d$ is the inductance associated with d-axis current, and $\phi_{mag0}$ is a pre-determined normalizing magnetic flux as a function of the q-axis current. The effect of temperature on $L_{d0} i^*_d - L_d i_d$ is negligible with respect to $\phi_{mag0} - \phi_{mag}$. From this, a magnetic scaling factor ($K_{MagneticScaleFactor}$) can be calculated as $$K_{MagneticScaledFactor} = 1 - \frac{\lambda_{d\_Error}}{\varphi_{m0}} \quad \text{(eq. 6)}$$

where $\phi_{m0}$ is the same as $\phi_{mag0}$.

In one embodiment, a reactive power based method is used to estimate the d-axis flux ($\hat{\lambda}_d$), although other methods may be also used. Magnetic and reluctance coefficients of the motor torque ($T_e$) may be calculated using offline data processing for both motoring as well as regenerating modes and as a function of the motor speed ($\omega_r$) of the PM machine 16 and the supply potential ($V_{dc}$) of the drive system 10.

Figure 2:
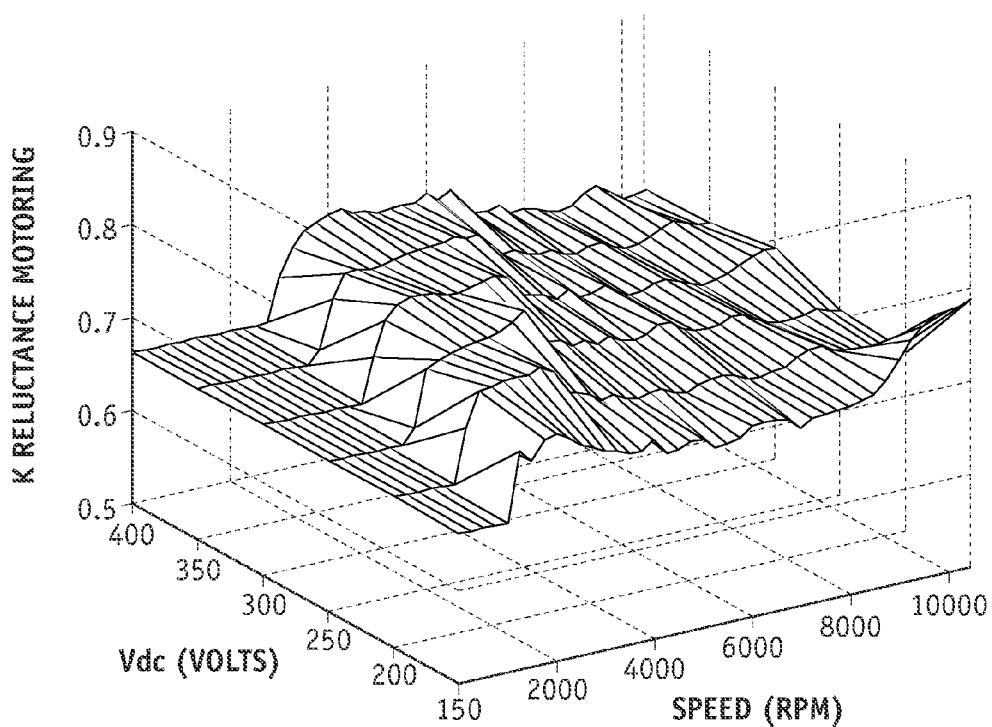
FIG. 2 is a plot illustrating the relationship among the reluctance motoring coefficient, the motor speed of a PM machine, and the supply voltage of a drive system in accordance with one embodiment.
Figure 3:
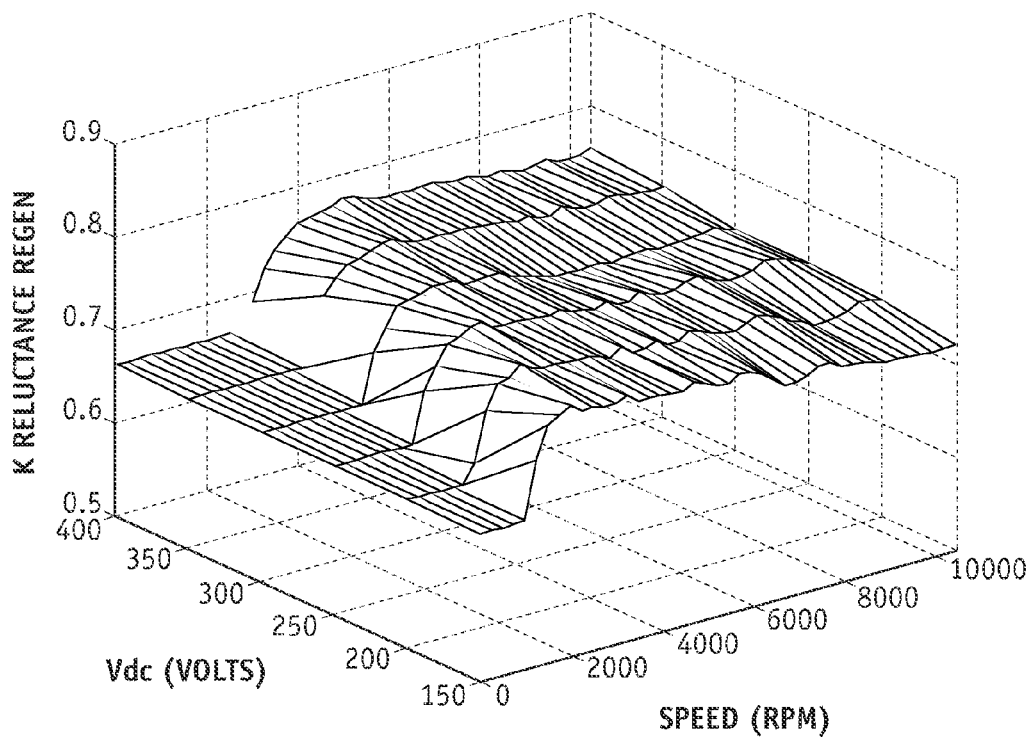
FIG. 3 is a plot illustrating the relationship among the reluctance regenerating coefficient, the motor speed of a PM machine, and the supply voltage of a drive system in accordance with one embodiment.

FIG. 2 is a plot illustrating the relationship among reluctance motoring coefficients ($K_{reluctance\_motoring}$), the motor speed of a PM machine, and the supply potential of a drive system in accordance with one embodiment. FIG. 3 is a plot illustrating the relationship among the reluctance regenerating coefficients ($K_{reluctance\_regen}$), the motor speed of a PM machine, and the supply potential of a drive system in accordance with one embodiment. Referring to FIGS. 1 and 2, the reluctance motoring coefficients and reluctance regenerating coefficients may pre-determined for the PM machine 16 as a function of the motor speed ($\omega_r$) and the supply potential ($V_{dc}$) of the drive system 10. Both FIGS. 1 and 2 are determined at the maximum torque operating point of the Pm machine 16. Additionally, the reluctance motoring coefficients and reluctance regenerating coefficients may be stored in one or more look-up tables in the processor memory 20, the machine properties memory 22, or the like.

Using the reluctance motoring coefficients ($K_{reluctance\_motoring}$), the reluctance regenerating coefficients ($K_{reluctance\_regen}$), the magnetic scaling factor ($K_{MagneticScaleFactor}$), and the torque limits that were pre-determined for the nominal temperature (e.g., the pre-determined motoring torque limits ($T_{Limit\_Tabl\_mot}$) and the pre-determined regenerating torque limits ($T_{Limit\_Tabl\_regen}$)), estimated maximum motoring torque limits ($T_{max\_motoring}$) and maximum regenerating torque limits ($T_{max\_regen}$) may be determined. The pre-determined motoring torque limits ($T_{Limit\_Tabl\_mot}$) and the pre-determined regenerating torque limits ($T_{Limit\_Tabl\_regen}$) may be stored in one or more look-up tables. In one embodiment, the estimated maximum motoring torque limits ($T_{max\_motoring}$) and maximum regenerating torque limits ($T_{max\_regen}$) are calculated as follows, $$T_{max\_motoring} = (K_{reluctance\_motoring} + (1 - K_{reluctance\_motoring})^* K_{MagneticScaleFactor})^* T_{Limit\_Tabl\_mot} \quad \text{(eq. 7)},$$

and $$T_{max\_regn} = (K_{reluctance\_regen} + (1 - K_{reluctance\_regen})^* K_{MagneticScaleFactor})^* T_{Limit\_Tabl\_regen} \quad \text{(eq. 8)}.$$

The estimated maximum motoring and regenerating torque limits may then be used to modify the torque command. The estimated maximum motoring and regenerating torque limits may have a limitation at or near zero motor speed because the d-axis flux estimation has a limitation at or near zero motor speed. The estimated maximum torque limits ($T_{max\_motoring}$ and $T_{max\_regen}$) may be transitioned to the pre-determined torque limits ($T_{Limit\_Tabl\_mot}$ and $T_{Limit\_Tabl\_regen}$) via a transition algorithm.

Based on the torque command, the motor speed of the PM machine 16, and a comparison of the estimated maximum torque limits with the pre-determined torque limits, final maximum torque limits for motoring and regenerating may be determined. In one embodiment, scaled index torques are calculated for d-axis current values and q-axis current values using the final maximum torque limits, the pre-determined torque limits, and the torque command. Thus, the torque command may be modified based on the final maximum torque limits. In a hybrid electric vehicle application, the final maximum torque limits may be provided to a hybrid control processor (HCP).

Figure 4:
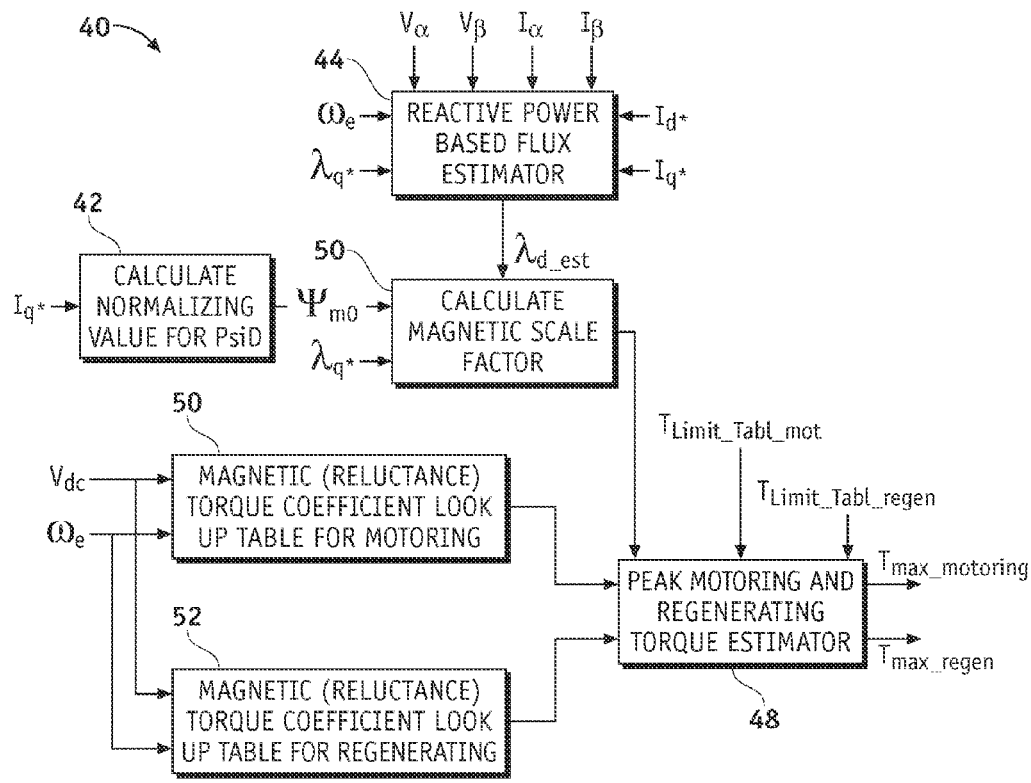
FIG. 4 is a block diagram illustrating a torque limit estimation in accordance with one embodiment of the present invention.

FIG. 4 is a block diagram illustrating a torque limit estimator 48 in accordance with one embodiment of the present invention. Referring to FIGS. 1 and 4, the torque limit estimator 48 can be embodied as a portion of an algorithm or a processing module 40 within the controller 12 that determines the estimated maximum torque limits ($T_{max\_motoring}$ and $T_{max\_regen}$). One or more of the components of the processing module 40 may be embodied in software or firmware, hardware, such as an application specific integrated circuit (ASIC), an electronic circuit, a processor (shared, dedicated, or group) and memory that execute one or more software or firmware programs, a combinational logic circuit, and/or other suitable components or combinations thereof.

The processing module 40 comprises a first sub-module 42 that calculates the normalizing magnetic flux as a function of the q-axis current command ($i_q^*$), a second sub-module 44 that calculates the estimated d-axis flux ($\lambda_{d\_est}$), a third sub-module 46 that calculates the magnetic scaling factor ($K_{MagneticScaleFactor}$), and the torque limit estimator 48. In one embodiment, the second sub-module 44 determines the estimated d-axis flux ($\lambda_{d\_est}$) using a reactive power based method which utilizes d-axis and q-axis current commands ($i_d^*, i_q^*$), stationary voltages and currents ($V_\alpha, V_\beta$ and $i_\alpha, i_\beta$, respectively), a q-axis flux command ($\lambda_q^*$), and the motor speed ($\omega_r$) as inputs.

The output of the first and second sub-modules 42 and 44 are supplied to the third module 46 along with d-axis flux command ($\lambda_d^*$) to calculate the magnetic scaling factor. The torque limit estimator 48 retrieves (e.g., from one or more look-up tables) a motoring torque coefficient ($K_{reluctance\_motoring}$) and a regenerating torque coefficient ($K_{reluctance\_regen}$) based on the supply potential ($V_{DC}$) and the motor speed ($\omega_r$). In one embodiment, the processing module 40 includes additional sub-modules 50 and 52 that generate magnetic (or reluctance) coefficients as a function of the supply potential ($V_{DC}$) and the motor speed ($\omega_r$) for motoring and regenerating operations, respectively. The outputs of the sub-modules 50 and 52 are supplied to the torque limit estimator 48 along with the pre-determined torque limits ($T_{Limit\_Tabl\_mot}$ and $T_{Limit\_Tabl\_regen}$) from the one or more look-up tables to determine the estimated maximum torque limits for both motoring and regenerating operations ($T_{max\_motoring}$ and $T_{max\_regenerating}$, respectively).

Figure 5:
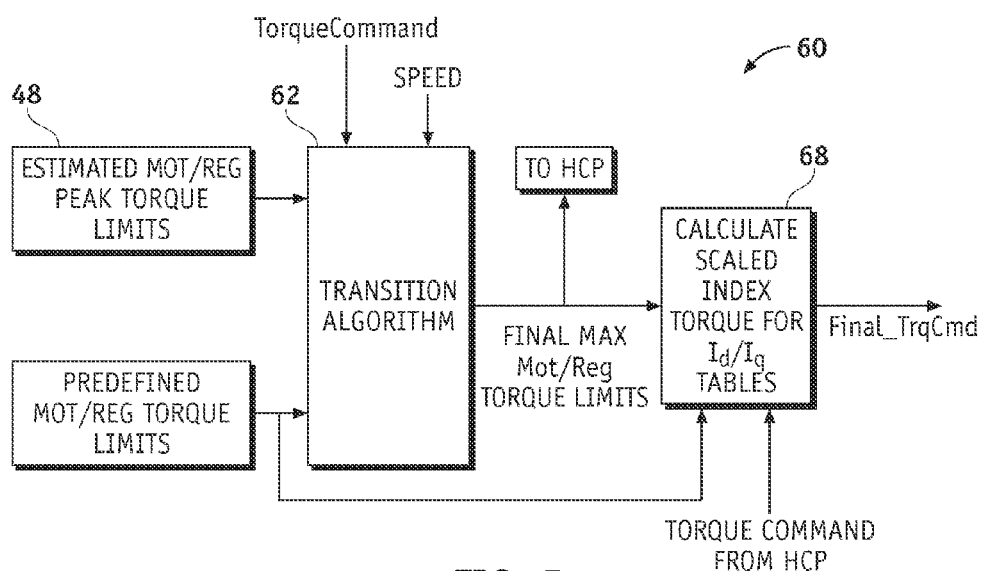
FIG. 5 is a block diagram illustrating a torque command adjustment in accordance with one embodiment of the present invention.

FIG. 5 is a block diagram illustrating a torque command adjustor 68 in accordance with one embodiment of the present invention. Referring to FIGS. 1, 4, and 5, the torque command adjustor 68 can be embodied as a portion of an algorithm or a processing module 60 in the controller 12 that determines a modified torque command (Final_TrqCmd) using the estimated maximum torque limits. One or more of the components of the processing module 60 may be embodied in software or firmware, hardware, such as an application specific integrated circuit (ASIC), an electronic circuit, a processor (shared, dedicated, or group) and memory that execute one or more software or firmware programs, a combinational logic circuit, and/or other suitable components or combinations thereof.

The processing module 60 comprises the transition sub-module 62 and the torque command adjustor 68. The estimated maximum torque limits and the pre-determined torque limits are supplied to the transition sub-module 62. For example, the estimated maximum torque limits ($T_{max\_motoring}$ and $T_{max\_regenerating}$) are supplied to the transition sub-module 62 from the torque limit estimator 48, and the pre-determined torque limits ($T_{max\_mot}$ and $T_{max\_reg}$) are retrieved from one or more look-up tables. The transition sub-module 62 utilizes the torque command (TorqueCmd) and the motor speed (Speed) to determine the final maximum torque limits for motoring and/or regenerating. In a hybrid electric vehicle embodiment, this final maximum torque limit is supplied to the HCP and torque command adjustor 68 calculates the scaled index torque for d-axis and q-axis current look-up tables using the torque command from the HCP and the pre-determined torque limits ($T_{max\_mot}$ and $T_{max\_reg}$) from the one or more look-up tables. The torque command adjustor 68 thus adjusts the torque command to compensate for variations in the torque produced by the PM machine 16 that are associated with magnet temperature variation.

Figure 6:
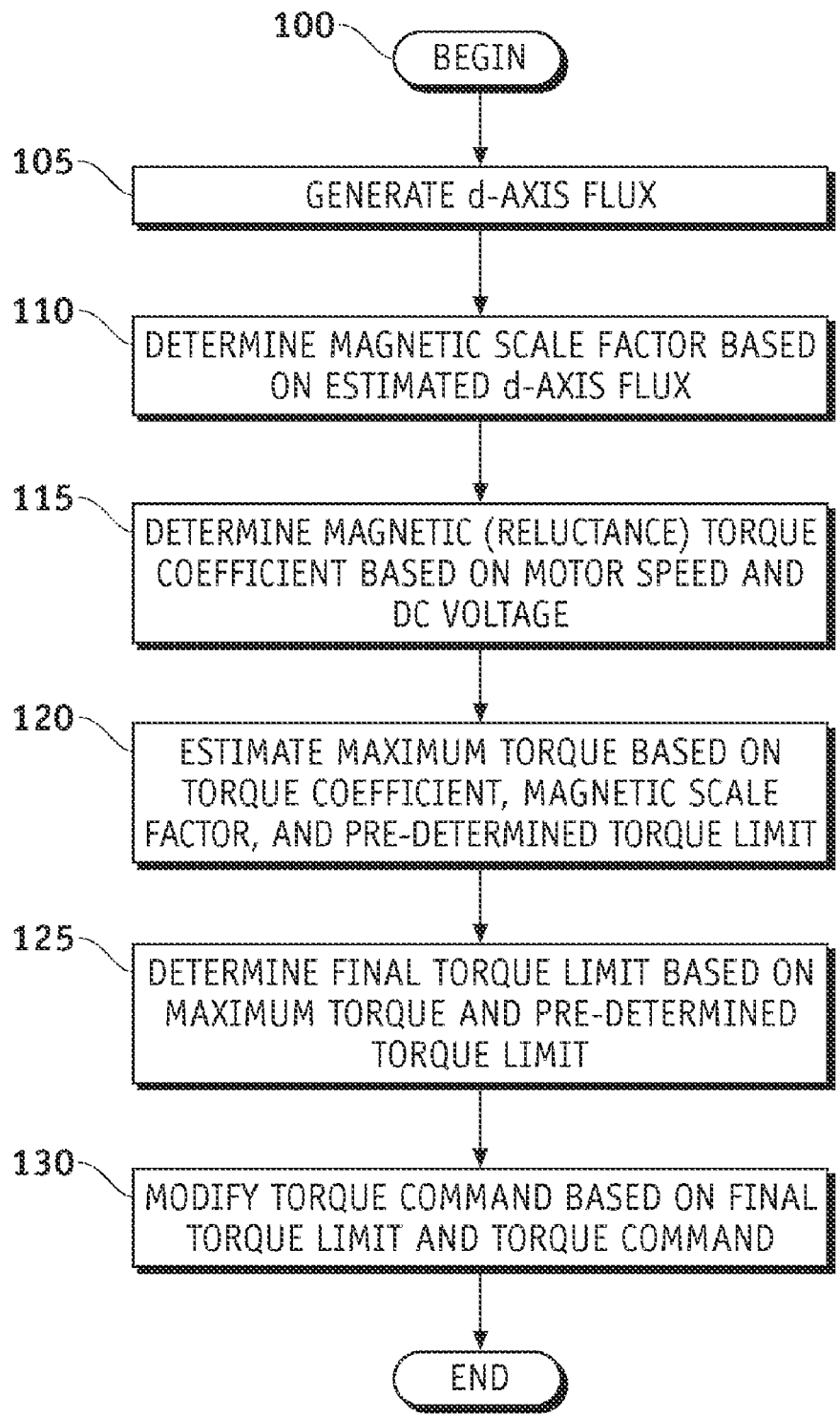
FIG. 6 is a flow diagram of a method for controlling a permanent magnet machine in accordance with an exemplary embodiment of the present invention.

FIG. 6 is a flow diagram of a method 100 for controlling a PM machine in accordance with an exemplary embodiment of the present invention. A d-axis flux of the PM machine is estimated, as indicated at step 105. Referring to FIGS. 1 and 4-6, the d-axis flux of the PM machine 16 is estimated, for example. In one embodiment, the estimated d-axis flux ($\lambda_{d\_est}$) is produced using a reactive power based method. A magnetic scale factor ($K_{MagneticScaleFactor}$) is determined based on the estimated d-axis flux, a commanded d-axis flux ($\lambda_d^*$), and a normalizing magnetic flux, as indicated at step 110. In one embodiment, the normalizing magnetic flux ($\phi_{mag0}$) is determined, based on the q-axis current command ($i_q^*$), prior to determining the magnetic scale factor. A torque coefficient is determined based on a DC voltage of the PM machine and a motor speed of the PM machine, as indicated at step 115. In one embodiment, at least one of a motoring torque coefficient (e.g., $K_{reluctance\_motoring}$) and a regenerating torque coefficient (e.g., $K_{reluctance\_regen}$) is determined based on the DC voltage ($V_{DC}$) of the PM machine 16 and the motor speed ($\omega_r$) of the PM machine.

A maximum torque is estimated based on the torque coefficient, the magnetic scale factor, and a pre-determined torque limit, as indicated at step 120. In one embodiment, the maximum torque of the PM machine 16 is determined based on an error between the commanded d-axis flux ($\lambda_d^*$) and an estimated d-axis flux ($\lambda_{d\_est}$) of the PM machine 16. For example, a maximum torque of the PM machine 16 is determined based on an error between the commanded d-axis flux and the estimated d-axis flux. The error represents a variation between a current temperature of the PM machine 16 and a nominal temperature of the PM machine 16 (e.g., the temperature at which the pre-determined torque limits (e.g., $T_{Limit\_Tabl\_mot}$ and $T_{Limit\_Tabl\_regen}$) were calculated. In one embodiment, a maximum motoring torque ($T_{max\_motoring}$) is estimated based on the motoring torque coefficient ($K_{reluctance\_motoring}$), the magnetic scale factor ($K_{MagneticScaleFactor}$), and a stored motoring torque limit ($T_{Limit\_Tabl\_mot}$). For example, the maximum motoring torque is estimated by calculating $$T_{max\_motoring} = (K_{reluctance\_motoring} + (1 - K_{reluctance\_motoring}) * K_{MagneticScaleFactor}) * T_{Limit\_Tabl\_mot}.$$

In another embodiment, a maximum regenerating torque ($T_{max\_regn}$) is estimated based on the regenerating torque coefficient ($K_{reluctance\_regen}$), the magnetic scale factor, and a stored regenerating torque limit ($T_{Limit\_Tabl\_regen}$). For example, the maximum regenerating torque is estimated by calculating $$T_{max\_regn} = (K_{reluctance\_regen} + (1 - K_{reluctance\_regen}) * K_{MagneticScaleFactor}) * T_{Limit\_Tabl\_regen}.$$

In another embodiment, the maximum motoring torque and the maximum regenerating torque are both estimated.

A final torque limit is determined (e.g., via the transition sub-module 62) based on a comparison of the maximum torque and the pre-determined torque limit, as indicated at step 125. For example, the maximum torque is selected as the final torque limit if a difference between the maximum torque and the pre-determined torque limit exceeds a pre-determined margin. The torque command (T*) is adjusted based on the final torque limit and the torque command to produce a modified torque command (e.g., Final_TrqCmd) that compensates for magnet temperature variation from the nominal temperature, as indicated at step 130. In one embodiment, a scaled index torque is calculated for the d-axis current and the q-axis current based on the final torque limit and the torque command. The torque command is then adjusted based on the scaled index torque to compensate for a temperature variation of the PM machine 16 from a nominal temperature.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A method for controlling a permanent magnet (PM) machine responsive to a commanded d-axis flux and a torque command, the method comprising the steps of:

determining a maximum torque of the PM machine based on an error between the commanded d-axis flux and an estimated d-axis flux of the PM machine, the error associated with a variation between a current temperature of the PM machine and a nominal temperature of the PM machine; and adjusting the torque command based on the maximum torque to compensate for the variation.

2. A method according to claim 1, wherein the step of determining a maximum torque comprises:
   determining a magnetic scale factor based on the estimated d-axis flux, the commanded d-axis flux, and a normalizing magnetic flux;
   determining a torque coefficient based on a direct current (DC) voltage of the PM machine and a motor speed of the PM machine; and
   estimating the maximum torque based on the torque coefficient, the magnetic scale factor, and a pre-determined torque limit.

3. A method according to claim 2, further comprising, prior to the step of determining a magnetic scale factor:
   calculating the normalizing magnetic flux based on a q-axis current command; and
   determining the estimated d-axis flux of the PM machine.

4. A method according to claim 3, wherein the step of determining the estimated d-axis flux comprises producing the estimated d-axis flux using a reactive power based method.

5. A method according to claim 2, further comprising:
   determining a final torque limit based on a comparison of the maximum torque and the pre-determined torque limit; and
   calculating a scaled index torque for a d-axis current and a q-axis current based on the final torque limit with a torque command.

6. A method according to claim 5, wherein the step of determining a final torque limit comprises selecting the maximum torque as the final torque limit if a difference between the maximum torque and the pre-determined torque limit exceeds a pre-determined margin.

7. A method according to claim 5, wherein the step of adjusting comprises adjusting the torque command based on the scaled index torque to compensate for a temperature variation of the PM machine from a nominal operating temperature of the PM machine.

8. A method according to claim 2, wherein the step of determining a torque coefficient comprises determining at least one of a motoring torque coefficient and a regenerating torque coefficient based on the DC voltage of the PM machine and the motor speed of the PM machine; and wherein the step of estimating a maximum torque comprises at least one of:
   estimating a maximum motoring torque ($T_{max\_motoring}$) based on the motoring torque coefficient ($K_{reluctance\_motoring}$), the magnetic scale factor ($K_{MagneticScaleFactor}$), and a stored motoring torque limit ($T_{Limit\_Tabl\_mot}$); and
   estimating a maximum regenerating torque ($T_{max\_regn}$) based on the regenerating torque coefficient ($K_{reluctance\_regen}$), the magnetic scale factor, and a stored regenerating torque limit ($T_{Limit\_Tabl\_regn}$).

9. A method according to claim 8, wherein the step of estimating the maximum motoring torque comprises calculating $$T_{max\_motoring}=(K_{reluctance\_motoring}+(1-K_{reluctance\_motoring})*K_{MagneticScaleFactor})*T_{Limit\_Tabl\_mot});$$

and wherein the step of estimating the maximum regenerating torque comprises calculating $$T_{max\_regn}=(K_{reluctance\_regen}+(1-K_{reluctance\_regen})*K_{MagneticScaleFactor})*T_{Limit\_Tabl\_regn}).$$

10. A system for controlling a permanent magnet (PM) machine responsive to a commanded d-axis flux and a torque command, the system comprising:
    a first processing module configured to estimate a maximum torque of the PM machine for a current operating temperature based on an error between the commanded d-axis flux and an estimated d-axis flux of the PM machine, the error associated with a temperature variation from a nominal operating temperature of the PM machine; and
    a second processing module coupled to the first processing module, the second processing module configured to adjust the torque command based on the maximum torque to compensate for the temperature variation.

11. A system according to claim 10, wherein the first processing module is further configured to:
    determine a magnetic scale factor based on the estimated d-axis flux, the commanded d-axis flux, and a normalizing magnetic flux;
    determine a torque coefficient based on a direct current (DC) voltage of the PM machine and a motor speed of the PM machine; and
    estimate the maximum torque based on the torque coefficient, the magnetic scale factor, and a pre-determined torque limit.

12. A system according to claim 11, further comprising a memory coupled to the first processing module, the memory comprising a plurality of look-up tables, a first look-up table of the plurality of look-up tables configured to store a plurality of torque limits, and a second look-up table of the plurality of look-up tables configured to store a plurality of torque coefficients; and wherein the first processing module is further configured to:
    retrieve a first torque limit from the first look-up table;
    retrieve a first torque coefficient from the second look-up table based on the DC voltage and the motor speed; and
    estimate the maximum torque based on the first torque coefficient, the magnetic scale factor, and the first torque limit.

13. A system according to claim 11, further comprising a memory comprising a plurality of look-up tables, a first look-up table of the plurality of look-up tables configured to store a plurality of motoring torque coefficients, a second look-up table of the plurality of look-up tables configured to store a plurality of regenerating torque coefficients, and a third look-up table of the plurality of look-up tables configured to store a plurality of torque limits; and wherein the first processing module is further configured to:
    retrieve a first motoring torque coefficient from the first look-up table based on the DC voltage and the motor speed;
    retrieve a first regenerating torque coefficient from the second look-up table based on the DC voltage and the motor speed;
    retrieve a first torque limit from the third look-up table;
    estimate a maximum motoring torque based on the first motoring torque coefficient, the magnetic scale factor, and the first torque limit; and
    estimate a maximum regenerating torque based on the first regenerating torque coefficient, the magnetic scale factor, and the first torque limit.

14. A system according to claim 11, wherein the PM machine is further operable based on a d-axis current command, a q-axis current command, first and second stationary voltages, first and second stationary currents, and a q-axis flux command; and wherein the first processing module is further configured to:

calculate the normalizing magnetic flux based on the q-axis current command; and determine the estimated d-axis flux of the PM machine based on the d-axis current command, the q-axis current command, the first and second stationary voltages, the first and second stationary currents, and the q-axis flux command.

15. A system according to claim 14, wherein the first processing module is further configured to determine the estimated d-axis flux based on a reactive power of the PM machine.

16. A system according to claim 11, further comprising a memory coupled to the second processing module, the memory comprising one or more look-up tables, a first look-up table of the one or more look-up tables configured to store a plurality of torque limits; wherein the PM machine is further operable based on a d-axis current, a q-axis current; and wherein the second processing module is further configured to:

retrieve a first torque limit from the first look-up table;

determine a final torque limit based on a comparison of the maximum torque with the first torque limit; and calculate a scaled index torque based on the final torque limit, the torque command, the d-axis current, and the q-axis current.

17. A system according to claim 10, wherein the first processing module is further configured to:

estimate a maximum motoring torque of the PM machine for the current operating temperature based on the error between the commanded d-axis flux and the estimated d-axis flux of the PM machine; and estimate a maximum regenerating torque of the PM machine for the current operating temperature based on the error between the commanded d-axis flux and the estimated d-axis flux of the PM machine; and wherein the second processing module is further configured to:

adjust the torque command based on at least one of the maximum motoring torque and the maximum regenerating torque to compensate for the temperature variation.

18. A drive system comprising:

a permanent magnet (PM) machine having a first torque limit at a nominal temperature and having a magnet temperature;

an inverter coupled to the PM machine, the inverter configured to drive the PM machine with an alternating current (AC) voltage, the PM machine producing a current based on the AC voltage; and a controller coupled to the inverter, the controller configured to determine a second torque limit of the PM machine based on the magnet temperature and further configured to adjust the current based on the second torque limit to compensate for a variation between the magnet temperature and the nominal temperature.

19. A drive system according to claim 18, wherein the PM machine has a motor speed; wherein the inverter is operable based on a q-axis current and a commanded d-axis flux and further configured to produce the AC voltage based on a direct current (DC) voltage; and wherein the controller is further configured to:

determine an estimated d-axis flux of the PM machine using a reactive power based method;

determine a normalizing magnetic flux based on the q-axis current;

determine a magnetic scale factor based on the estimated d-axis flux, the commanded d-axis flux, and the normalizing magnetic flux;

retrieve a torque coefficient based on the motor speed and the DC voltage; and estimate the second torque limit based on the torque coefficient, the magnetic scale factor, and the first torque limit.

20. A drive system according to claim 19, wherein the inverter is further operable based on a torque command; and wherein the controller is further configured to:

determine a final torque limit based on a comparison of the first torque limit with the second torque limit, the torque command, and the motor speed; and calculate a scaled index torque based on the final torque limit, the first torque limit, and the torque command.

* * * * *